United States Patent [19]

Dishon et al.

[11] Patent Number: 4,849,978
[45] Date of Patent: Jul. 18, 1989

[54] MEMORY UNIT BACKUP USING CHECKSUM

[75] Inventors: Yitzhak Dishon, Stamford, Conn.; Christos J. Georgiou, White Plains, N.Y.

[73] Assignee: International Business Machines Corporation, Armonk, N.Y.

[21] Appl. No.: 68,862

[22] Filed: Jul. 2, 1987

[51] Int. Cl.⁴ .............................................. G06F 11/10
[52] U.S. Cl. ...................................... 371/51; 371/21; 371/53
[58] Field of Search .................... 371/21, 51, 53, 50, 371/49, 37, 38, 44; 360/53

[56] References Cited

U.S. PATENT DOCUMENTS

| | | | |
|---|---|---|---|
| 3,876,978 | 4/1975 | Bossen | 360/53 |
| 4,019,033 | 4/1977 | Parmet | 371/51 |
| 4,679,196 | 7/1987 | Tsujimoto | 371/51 |

Primary Examiner—Michael R. Fleming
Attorney, Agent, or Firm—Terry J. Ilardi; Ronald L. Drumheller

[57] ABSTRACT

A memory system backup for use in a tightly or loosely coupled multiprocessor system. A plurality of primary memory units having substantially the same configuration are backed up by a single memory unit of similiar configuration. The backup memory unit holds the checksum of all data held in all primary memory units. In the event of the failure of one of the primary memory units its contents can be recreated based on the data in the remaining non-failed memory unit and the checksum in the backup unit.

6 Claims, 2 Drawing Sheets

MEMORY UNIT BACKUP USING CHECKSUM

BACKGROUND OF THE INVENTION

1. Field of the Invention

The subject invention pertains to the field of data processing and more particularly to a backed up memory system for use with multi or uniprocessors.

2. Description of the Prior Art

In both large and small data processing systems it has been found desirable to be able to reconstruct data in the event of failure of a memory unit. In a closely coupled architecture computer system where there are a number of processors that have access to a shared memory it is particularly important to be able to reconstruct data stored in memory if a portion of it is lost due to failure of one of the memory units. This shared memory includes several independent memory units each of which contain storage, a storage controller, microprocessor and an interface to the communication medium of the system. Such medium can be either a system of buses interconnected to the processor or serial transmission lines. There are various methods of interconnection that are used in the art such as point to point, multi-drop links, or cross bar switches. Typically, data is transferred between processors and memory units in blocks, typically on the order of 4096 bytes at a time.

A highly reliable system requires that data stored in any of the memory units will be available at all times, even in the event of the failure of an individual memory unit. While the reliability of a memory unit can be improved by duplicating some of its components, in general such measures are more complex and less economical than means that allow the reconstruction of data from alternate sources.

Classically, data availability in a system with shared memory is achieved by storing two copies of the data in two separate units. Such systems use a one to one backup known as duplexing. This is an expensive solution, however, since it requires a complete duplication of all memory units and thus requires double the storage that would otherwise be necessary. In systems that require large amounts of memory, duplexing is costly not only due to costs of memories, but also due to econonmic factors like floor space, service etc. It is thus desirable to be able to assure backup of a memory system while not duplicating each unit in the memory system.

In U.S. Pat. No. 4,092,732, to Ouchi, a system for recovering data stored in disk drives is described, in which data records are subdivided into segments that are distributed over n independent disk drives. A checksum segment contains the modulo-2 checksum of all other segments and is stored on an additional disk drive. This patent relates specifically to direct access storage devices (DASD) and requires a particular segmentation and distribution of data over multiple devices. In contrast, the present invention relates to all memory types and does not require special formatting or distribution of data over multiple memory units.

In Riggle et al, U.S. Pat. No. 4,413,339, a Reed Solomon code is implemented for checking data transferred between a single data processing device and a data storage device. This patent does not deal with storing data in multiple storage systems accessible to multiple data processing systems.

In Murphy et al, U.S. Pat. 4,412,280, cross checking data between two data processing systems, using a checksum is described. Murphy et al, however, does not describe storing data in multiple memory units accessible to multiple data processing systems, nor the use of a single backup memory unit to backup data in all memory units.

The basic concept of the checksum method to recover from single data failures is well known in the art and is described in Siewiorek et al "The Theory and Practice of Reliable System Design", Digital Press, 1982 and Ohrnstein et al "Pluribus-A Reliable Multi Processor", AFIPS Conference Proceedings, Volume 44, Pages 551-559, AFIPS Press, Montvale, N.J., 1975, but backing up multiple memory units using a single backup memory unit and the associated problems and solutions of the present invention are not disclosed.

It is thus an object of the present invention to provide a highly reliable and available memory system.

It is a further object of the invention to provide a highly available and reliable memory system having only minimal increase in cost and other overhead to the system.

It is still a further object of the invention to provide a highly reliable and available memory system for use in a multi processing system that requires the addition of only one memory unit, assuming no two memory units or processors fail concurrently.

These and other objects, advantages and features of the invention will be more apparent upon reference to the following specification and the annexed drawings.

SUMMARY OF THE INVENTION

In accordance with an illustrative embodiment demonstrating objects and features of the present invention, there is provided a highly reliable and available memory system comprised of a plurality of memory units each equivalent to each other in design and performance. To these n units one additional memory unit is used which serves as a backup. The backup data stored in the backup memory unit consists of the checksum of all data stored in all other memory units such that a word at address x in the backup unit is the checksum of all words at address x of all other memory units. The checksum is based on the modulo 2 addition of base 2 numbers, although other modulos and bases are not excluded. If any other unit fails other than the backup unit its contents can be reconstructed by adding modulo 2 the contents of all non-failed memory units to the stored checksum in the backup unit. Should the backup unit fail, its contents can, of course, be recreated from the contents of the memory units being backed up.

DETAILED DESCRIPTION OF THE PREFERRED EMBODIMENTS

Figure 1:
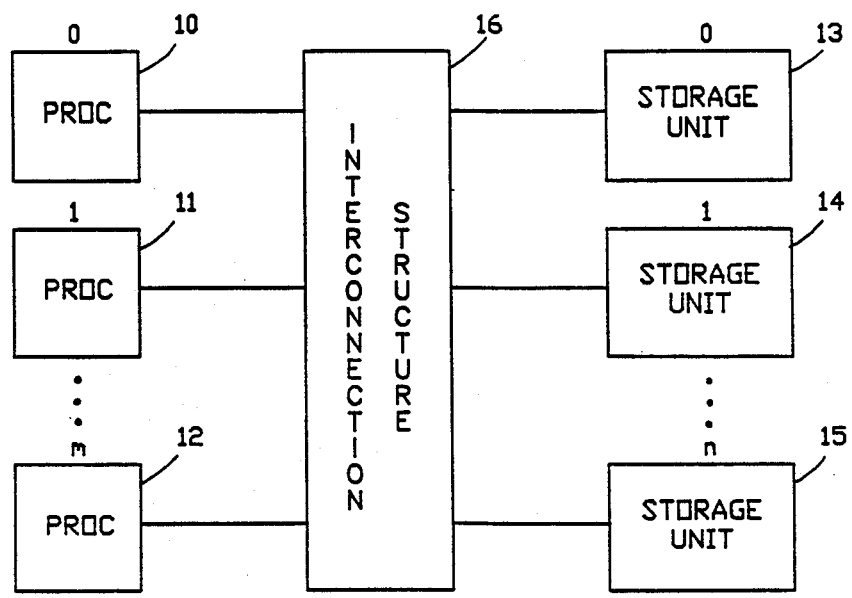
FIG. 1 shows a generic closely coupled computer system.

FIG. 1 shows a typical system of loosely or closely coupled processors having a shared memory. The system is comprised of processors 10, 11 and 12 coupled to memory units 13, 14 and 15 via interconnect structure 16. It will be clear to those skilled in the art that any number of processors can be used in such a system and any number of memory units as well. Interconnection structure 16 may be any means of connection processors and memory units, as mentioned above, such as point to point connection, multi-drop network or cross bar switches.

Figure 2:
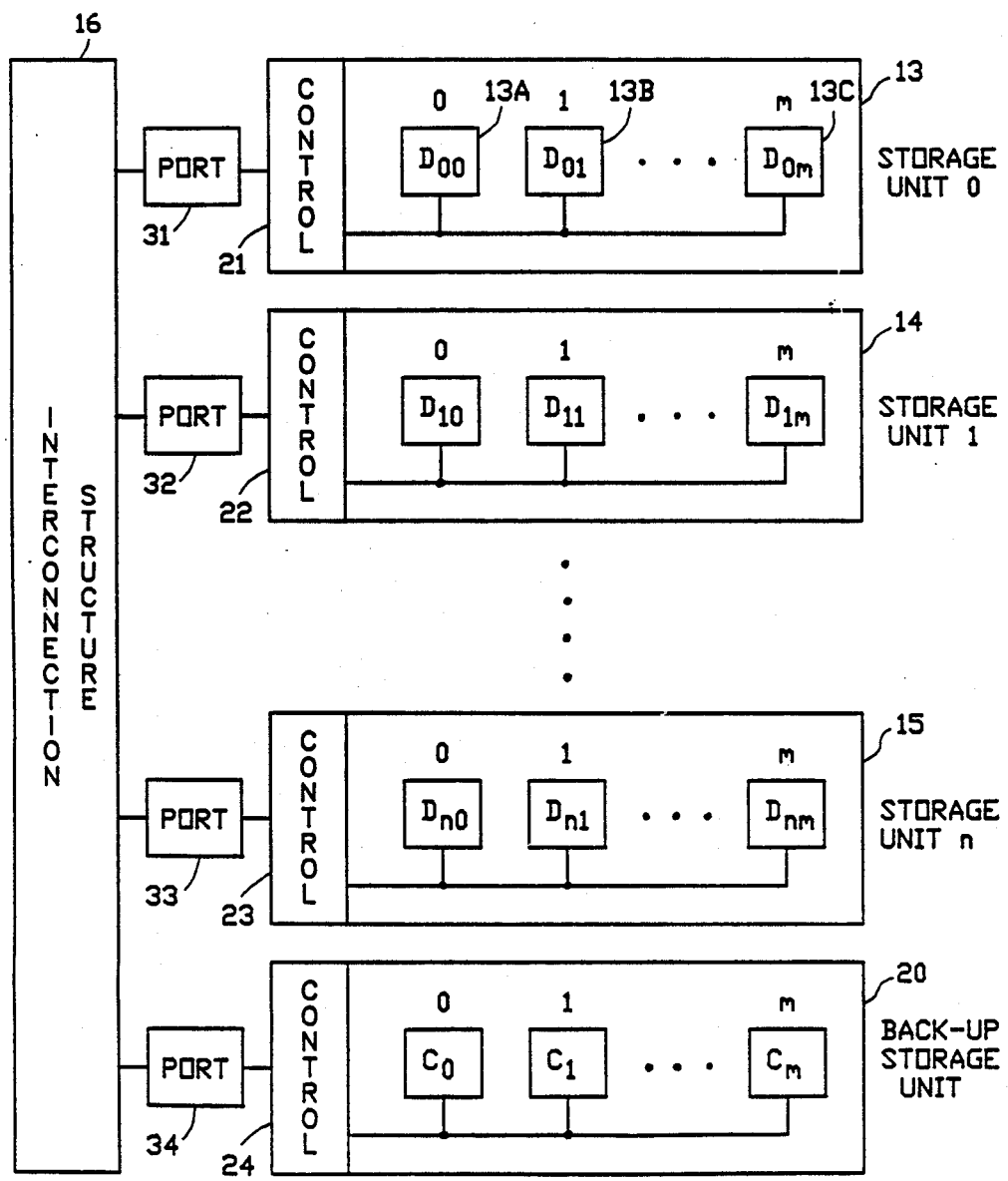
FIG. 2 shows an overall block diagram of the present invention.

In the present invention, as shown in FIG. 2, additional memory unit 20 is added which acts as a backup for all other memory units in the system. Memory unit 20 will have similar capacity and at least the bandwidth of memory units 13, 14 and 15. Each of memory units 13, 14, 15 and 20 includes m subunits. Thus, for example, memory unit 13 includes subunits 13 a, b and c. These subunits may be, for example, memory cards. Additionally, each memory unit 13, 14, 15 and 20 include control circuitry, 21, 22, 23 and 24 which controls addressing, etc, and allows bidirectional communication with other processors and memory units via ports 31, 32, 33 and 34 respectively. Clearly, memory unit 20 cannot backup data contained in memory units 13, 14 and 15 on a one to one basis since its capacity is similar to the capacity of these units. Instead, the backup data consists of the modulo 2 checksum of all data stored in all other memory units including memory units 13, 14 and 15 such that a word at address x in the backup unit is the checksum of all words at address x and the other memory units 13, 14 and 15. Data is stored in word sizes at each address in the memory unit. In order to backup data stored in, for example, memory unit 13 at address 0, the data at address 0 is exclusive ORed bit by bit with each other and the result is stored at address 0 of the backup unit 20. This result is the checksum. When a memory unit fails all data at address 0 of the surviving units are exclusive ORed with the checksum at address 0 of backup unit 20. The result is reconstructed data of address 0 of the failed memory unit, which can be stored space available in one of the existing memory units 13, 14 and 15 or a spare memory unit reserved for this purpose. The process is repeated for all other addresses of the failed memory unit until all data are reconstructed.

The checksum generated in the present invention is based on the modulo 2 addition of base 2 numbers. Thus, if a, b, c and x are binary values then, $$x = a \oplus b \oplus c \tag{1}$$

is the checksum of a, b and c.

$$b = a \oplus x \oplus c \tag{2}$$

is the value of b computed from a, c and the checksum x. Binary numbers a and c can also be solved for algebraically.

A more formal treatment of checksums may be found in textbooks of modern algebra under discussion of Galois fields.

The modulo 2 addition ($\oplus$) of binary values a, b is defined by the following addition table:

| a | b | $\oplus$ |
|---|---|---|
| 0 | 0 | 0 |
| 0 | 1 | 1 |
| 1 | 0 | 1 |
| 1 | 1 | 0 |

This is also known as the Exclusive OR of a,b. Formulas 1 and 2 can be extended to blocks of data as shown in the following example:

```
0 1 0 0 1 0 1 1 0 1 0 0 1 0 1 1
0 1 1 0 0 1 0 0 1 1 0 1 1 1 1 1
1 1 0 0 1 0 1 1 0 0 0 1 0 1 1 0
1 0 1 0 1 1 1 1 0 1 1 0 0 0 1 1
         x = a ⊕ b ⊕ c
``` where x is the checksum of blocks a, b, c.

A bit of data can be recovered if one and only one bit of data of which the checksum was composed is lost. This can be extended as well to a block of data, as in the example above, or to a unit in general. The following serves as an example:

```
0 1 0 0 1 0 1 1 0 1 0 0 1 0 1 1
1 1 0 1 0 1 0 0 0 1 1 0 1 1 1 1
0 0 0 1 1 0 1 1 1 0 0 0 1 1 1 0
0 1 1 0 1 1 1 1 1 0 1 0 0 0 1 1
         b = a ⊕ x ⊕ c
```

Thus, were the memory unit holding data of block b to fail it could be recovered as shown above from the checksum x and blocks a and c.

Thus, referring to FIG. 2 the checksum at address i of the backup unit is defined as:

$$C_i = D_{0i} \oplus D_{1i} \ldots \oplus D_{ni} \tag{3}$$

Data of failed memory unit k at address i is reconstructed as:

$$D_{ki} = D_{0i} \oplus D_{1i} \alpha \ldots \oplus D_{(k-1)i} \oplus C_i \oplus \ldots \oplus D_{ni} \tag{4}$$

From the above it appears that in order to generate the checksum it would be necessary to fetch the data of the n memory units, send it to the backup unit, exclusive OR (modulo 2 addition) this partial result with the old checksum there and then store the result as the next checksum. Such an approach would require n+1 transfers for each data word stored and thus could seriously overload the system interconnection structure 16. Thus an alternative approach is desirable which minimizes transfers over the interconnection structure. Such an alternative method is described below in which only two transfers are needed to generate and store the new checksum. Mathematically this alternative may be described as follows:

$$\text{Let } C_{old} = D_0 \oplus D_1 \oplus \ldots \oplus D_{k-old} \oplus \ldots \oplus D_n \tag{5}$$

be the old checksum at some address i at backup unit 20.

Let $D_{k-new}$ be the new data, replacing $D_{k-old}$ at address i of memory unit k.

Then $$C_{new} = D_0 \oplus D_1 \oplus \ldots \oplus D_{k-new} \oplus \ldots \oplus D_n \tag{6}$$

$$= (D_{k-old} \oplus D_{k-new}) \oplus D_0 \oplus D_1 \oplus \ldots \oplus D_{k-old} \oplus \ldots + D_n \tag{7}$$

is the new checksum.

$$= (D_{k-old} \oplus D_{k-new}) \oplus C_{old} \tag{8}$$

These subsititutions are possible since $D_{k-old} \oplus D_{k-old} = 0$ modulo 2 and addition is commutative.

Thus to store data at memory unit k at address i and back it up at backup unit 20 at address i, the new checksum is generated by exclusive ORing in memory unit k at address i the new data with the old data, then sending this partial result to the backup unit 20 where it is exclusive ORed with the old checksum at address i, and the result is stored as the new checksum in unit x at address i. The process is repeated for each word of data to be stored at unit k.

In case of failure, recovery is accomplished by fetching data from all addresses of the first surviving unit, sending it to the backup unit and exclusive ORing it there with the checksum stored there. This is repeated for all remaining units. When all units are done in this fashion, backup unit 20 now contains the recovered data. While recovery takes place, no new data may be stored in any address for which recovery has not yet been completed. Of course, if the backup unit itself were to fail, no data would have been lost. It may be desirable, however, to put a new memory unit into service and regenerate the checksum for the existing data and store it there.

The overall performance of a system using the backup of the present invention depends upon the bandwidth of the interconnection structure and the bandwidth of the memory units used. It should be noted however that the backup unit needs to be accessed only for writes of any other memory units, which is at a rate typically less than the reads. Further the backup unit may have an internal bandwidth and performance higher than the other units, thus making real time backup dependent only upon the overall bandwidth of the interconnection structure.

If two or more memory units are concurrently updated with data at the same address i, the update of the checksum at address i in the backup unit must be serialized since the old checksum has to be exclusive ORed with the new partial checksum ($D_{old} \oplus D_{new}$). Traffic on the interconnection structure, which may cause a momentary blocking of the access path to the backup memory unit provides another reason for serialization. The serialization of the checksum update is of no consequence to the checksum validity, since modulo 2 addition is commutative. Thus the checksum at any address may be updated in any order.

Ultimately, the checksum will always reflect correctly all the data stored in all the memory units.

Serialization does have implications on the recovery procedures, since the checksum stored at an address in the backup unit may momentarily not reflect the data stored in a particular memory unit. Thus recovery techniques must take this into consideration as discussed further herein below.

If one (and only one) of the memory units fail, recovery is accomplished as follows. All data transfers to all memory units are halted and all pending checksum updates, due to serialization, are completed. Data from the first surviving memory unit is then transferred to the backup unit where it is added modulo 2 to the checksum stored there. This procedure is repeated for all other surviving memory units. When data from the last memory unit has thus been exclusive ORed with the data in the backup unit, the backup unit will now contain the recovered data from the failed memory unit.

At this point the recovered data may be transferred from the backup unit to new storage space that is made available for use under such circumstances. Such space is made available either in a spare memory unit or by moving data from the existing memory units to the next lower level of the storage hierarchy. Finally, after data recovery is completed, a new checksum is generated in the backup unit, which reflects the new placement of the data. New data transfers to the memory units may then be resumed.

Since serialization of the checksum update may temporarily cause the checksum to incorrectly reflect the data of all memory units at any time, this recovery procedure should be modified as follows.

First it is assumed that data has been stored at address i of memory unit k. As a result of serialization, address i at the backup memory unit may not yet contain the corresponding change of the checksum when memory unit k fails. Thus, data at memory unit k at address i cannot be recovered from the checksum since that checksum reflects the previous data. To solve this problem, a further constraint is imposed, namely that the data must be preserved at the source processor until acknowledgements have been received that both the memory and the backup units have been successfully updated. This constraint should not severely affect the traffic load in the interconnection structure 16 if the acknowledgement is used for a large block of data, for example, 4 k bytes. Using this constraint and the assumption that only one memory unit fails at a time, complete procedures for recovery are developed as follows.

Two cases are described. In the first case the memory unit was not being accessed for data storage at the time of failure and, in the second, the memory unit was being accessed for data storage at the time of failure.

In the first case, that is, when the memory unit was not being accessed for data storage at the time of failure, all serialized updates of the checksum will have been correctly completed since the failing unit was not being accessed when the failure occurred. Thus the recovery can be followed according to the procedure previously discussed.

In the case where the memory unit was being accessed for data storage at the time of failure it is possible that the checksums stored at one or more addresses of the backup unit do not reflect data already stored in the failing unit as a result of serialization. If acknowledgement is provided after the successful storage of each block of data, the number of corresponding addresses in the backup unit cannot exceed the size of the block. Further, the data of this block still resides in the source processor, since no acknowledgement for it has yet been sent out. Thus after completion of any pending serialized checksum updates all other addresses of the backup unit will contain the correct checksum. Data for the failed memory unit can then be recovered as outlined above except for the block which was accessed when the memory unit failed. This block must be recovered from the data which is still stored in the source processor.

Implementation of the recovery procedures requires proper detection and management mechanisms which are described as follows:

1. One or more of the processors must be responsible for recovery and be accessible to all other processors and memory units. This will be termed the Recovery Processor.

2. Detection of memory unit failure is provided by various hardware checkers in the memory unit which have a signalling capability to the Recovery Processor. Ultimately, a processor can detect a failing memory unit either by not receiving a response when initially accessing it, or not receiving an acknowledgement when storing a block of data, after an appropriate time-out. Such information is then communicated to the Recovery Processor.

3. The backup memory unit must be initialized for each block transferred to the new memory unit as to block start address, byte count and memory unit address. When a partial checksum ($D_{k-new} \oplus D_{k-old}$) is transferred to the backup unit, its source is identified and thus the backup unit can identify the corresponding checksum address. The source address identification is normally part of the communications protocol of the interconnection structure 16.

4. Upon initiation of recovery, the Recovery Processor broadcasts a message to halt to all other processors. Each processor will complete any block to be stored which is already in progress. Each processor then in turn reports if it contains an unacknowledged block associated with the failed memory unit. The Recovery Processor then starts recovery as outlined previously.

5. After completion of recovery, the Recovery Processor broadcasts a message to proceed to all the other processors which subsequently resume processing.

Figure 3:
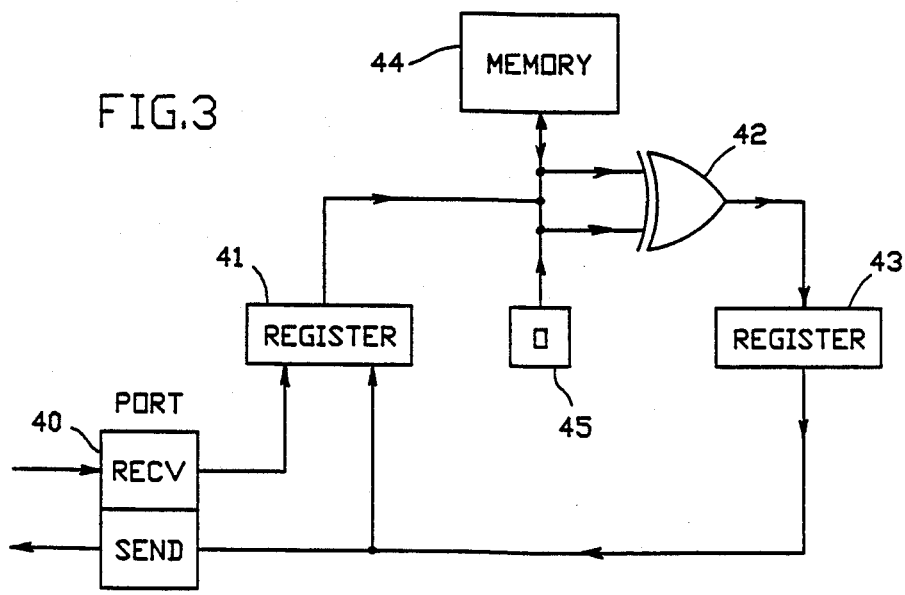
FIG. 3 shows a specific embodiment of the present invention that reduces system traffic.

Refer now to FIG. 3, which shows the implementation of the partial checksum generation at one memory unit or subunit. Such mechanism may be integrated into a memory chip with the appropriate controls. Note that the implementation is applicable to both data and backup memory units and that the same structure would be used at all memory units, for example, 13, 14, 15 and 20 as shown in FIG. 2.

Data is received from interconnect structure 16 on port 40 and is saved in register 41. The old data are fetched from memory 44 are then exclusive ORed at gate 42 with the data in register 41. The result is saved in register 43 from which it is transmitted to the backup memory unit over port 40. The new data are concurrently stored from register 41 into memory 44. If this is the backup unit the data in register 43 are transferred to register 41 and then stored in memory 44 as the new checksum.

Data to be fetched for the system are fetched from memory 44 and exclusive ORed with 0 from 45 which permits then to retain their original value. This data is then saved in register 43 from where it is transmitted to the system over port 40.

In summary, an apparatus for providing the economical and efficient backup of a plurality of memory units by one additional memory unit has been described.

We claim:

1. A memory for a computer system having a plurality of processors, a plurality of memory modules, and an interconnection network therebetween, said memory comprising:
    a plurality of memory modules having a plurality of memory spaces, said spaces in each of said memory modules having the same address labels;
    a backup memory unit having a plurality of memory spaces, said memory spaces having the same address labels as said memory modules;
    means for calculating a checksum of the contents of each memory space having the same memory address label in each of said memory modules, said checksum having a word length equal to a word length of said memory space;
    means for storing said checksum in a memory space in said backup unit having said same address label, requests to store data in same addresses being serialized, and wherein said processor from which data is generated for storage in a memory module retains said data until it has been acknowledged as having been received at said backup unit and said memory module; and
    means for calculating data stored previously in one of said memory modules from data in other memory modules and said checksum in said backup memory unit, said calculation being when there is a failure of said one memory module.

2. The memory system according to claim 1 wherein said checksum is calculated according to modulo 2 addition.

3. The memory system according to claim 2 wherein said means for calculating said checksum calculates a partial checksum of new data and old data at a memory space and calculates a new checksum from said partial checksum and a checksum previously stored in said backup memory, and said means for storing stores said new checksum in said backup memory.

4. A method for backing up a memory for a computer system having a plurality of processors, a plurality of memory modules, and an interconnection network therebetween, said method, comprising:
    providing a plurality of memory modules having a plurality of memory spaces, said spaces in each of said memory modules having the same address labels;
    providing a backup memory unit having a plurality of memory spaces, said memory spaces having the same address labels as said modules;
    calculating a checksum of the contents of each memory space having the same memory address label in each of said memory modules;
    storing said checksum in a memory space in said backup unit having said same address labels, and serializing requests to store data in same addresses;
    retaining said data in said processor from which data is generated until it has been acknowledged as having been received at said backup unit and said memory module; and
    calculating data in a one of said memory modules from data in other memory modules and said checksum in said backup memory unit, said calculation being made failure of said one memory module.

5. The method according to claim 4 wherein said checksum calculation is by modulo 2 addition.

6. The method according to claim 5 wherein said checksum calculation comprises the steps of:
    calculating a partial checksum of new data and old data at a memory space in a memory unit;
    calculating a new checksum from said, partial checksum and a checksum previously stored in said backup memory; and
    said step of storing comprises storing said new checksum in said backup memory.

* * * * *